United States Patent [19]

Luther et al.

[11] Patent Number: 4,602,658
[45] Date of Patent: Jul. 29, 1986

[54] CHEMICAL AGENT AND WATERPROOF CONNECTOR FOR LIQUID CONDITIONS SUIT INTERFACE

[75] Inventors: Manfred Luther, Willowdale; Jean C. Steffler; Anthony G. Hynes, both of Downsview; Christopher J. Brooks, Dartmouth, all of Canada

[73] Assignee: The United States of America as represented by the Secretary of the Army, Washington, D.C.

[21] Appl. No.: 752,888

[22] Filed: Jul. 8, 1985

[30] Foreign Application Priority Data

Jul. 9, 1984 [CA] Canada .................................. 458479

[51] Int. Cl.⁴ ............................................. F16L 39/00
[52] U.S. Cl. ............................... 137/614; 137/614.02; 285/200; 2/2.1 A
[58] Field of Search ................. 137/614, 614.02, 269; 285/200, 66, 68; 2/2.1 A, 2.1 R

[56] References Cited

U.S. PATENT DOCUMENTS

| | | | |
|---|---|---|---|
| 2,954,562 | 10/1960 | Krupp ................................... | 2/2.1 A |
| 3,608,582 | 9/1971 | Lambert ...................... | 137/614.02 X |
| 3,751,727 | 8/1973 | Shepard et al. ...................... | 2/2.1 A |
| 3,777,750 | 12/1973 | Savoonin ........................ | 2/2.1 R X |
| 4,274,759 | 6/1981 | Long et al. ...................... | 2/2.1 R X |
| 4,524,807 | 6/1985 | Toliusis ........................ | 285/DIG. 22 |

Primary Examiner—A. Michael Chambers
Assistant Examiner—John C. Fox
Attorney, Agent, or Firm—Mark Goldberg; Anthony T. Lane; Robert P. Gibson

[57] ABSTRACT

A connector as disclosed for connecting fluid passages through a flexible sheet material. The connector is appropriate for use in connecting the coolant lines of a personal cooling garment through a waterproof immersion suit or a chemical proof outer garment. The connector includes inside and outside connector blocks with matching faces that sandwich the sheet material between them. Fluid passages through the two blocks meet at respective ports in the matching faces and are joined by coupling sleeves extending through holes in the sheet material. O-rings around the ports seal the holes through the sheet material. A cap screw or the like secures the two blocks to one another. The connector is equipped with valve male fittings and male lock components of a standard connector system that is now used for personal cooling garments. This allows the use of the connector in conjunction with an existing and satisfactory "zero leak" connect and disconnect system.

1 Claim, 6 Drawing Figures

CHEMICAL AGENT AND WATERPROOF CONNECTOR FOR LIQUID CONDITIONS SUIT INTERFACE

The invention described herein may be manufactured, used, and licensed by or for the Government for governmental purposes without the payment to us of any royalty thereon.

BACKGROUND OF THE INVENTION

The present invention relates to connectors for connecting fluid passages through flexible sheet materials. It has particular reference to connectors for connecting fluid coolant lines through impervious chemical protection or immersion suits.

In some environments it is desirable to wear a liquid cooled garment under an outer, impervious garment. For example, military aviators flying over bodies of cold water wear impervious immersion suits for protection against hypothermia in the event of ditching or ejection. An inner liquid cooled garment prevents heat stress that would otherwise be experienced inside the sealed immersion suit. Another example is an impervious chemical proof outer garment that should be accompanied by an inner cooling garment to prevent heat stress. The problem with this arrangement is passing the coolant lines through the outer garment while maintaining its integrity. It should also be possible to disconnect the coolant lines both inside and outside the outer garment quickly and without the loss of coolant.

A standard male and female "zero leak" connector is now available from Life Support Systems, Inc., of Mountain View, Calif., U.S.A. This connector is used for the coupling of personal cooling garments to an external cooling supply. The connector allows the quick coupling of supply and return lines and has valved ports that are self sealing when the connector is separated in order to prevent the loss of coolant. This type of connector is well suited for use as a cooling garment connecting but cannot be used with an impervious outer garment because it does not provide for a sealed passage of the supply and return lines through the outer garment.

SUMMARY OF THE INVENTION

The present invention aims at the provision of a connector for passing fluid passages, such as coolant lines, through a flexible sheet material such as an immersion suit or a chemical proof outer garment.

According to the present invention there is provided a connector for connecting a fluid passage through a flexible sheet material, comprising:

(a) inside and outside connector blocks with matching faces adapted to engage opposite faces of the sheet material;
(b) fluid passages through the inside and outside connector blocks meeting at respective ports in the matching faces;
(c) joint means for joining the opposed ports in a fluid tight manner; and
(d) fastener means for securing the two blocks to one another.

In use, the garment material is provided with holes for passage of the joint means, normally a connecting sleeve. The material is sandwiched between the two blocks. It is preferred to use O-ring seals around the ports sealing the blocks to the garment material to prevent leakage. In preferred embodiments of the connector, each block is equipped with male valved fittings and male locking elements compatible with commercially available quick disconnect systems, so that female components of such systems can be coupled to the connector inside and outside of the suit.

BRIEF DESCRIPTION OF THE DRAWINGS

In the accompanying drawings, which illustrate an exemplary embodiment of the present invention.

DETAILED DESCRIPTION

Figures 1, 2:
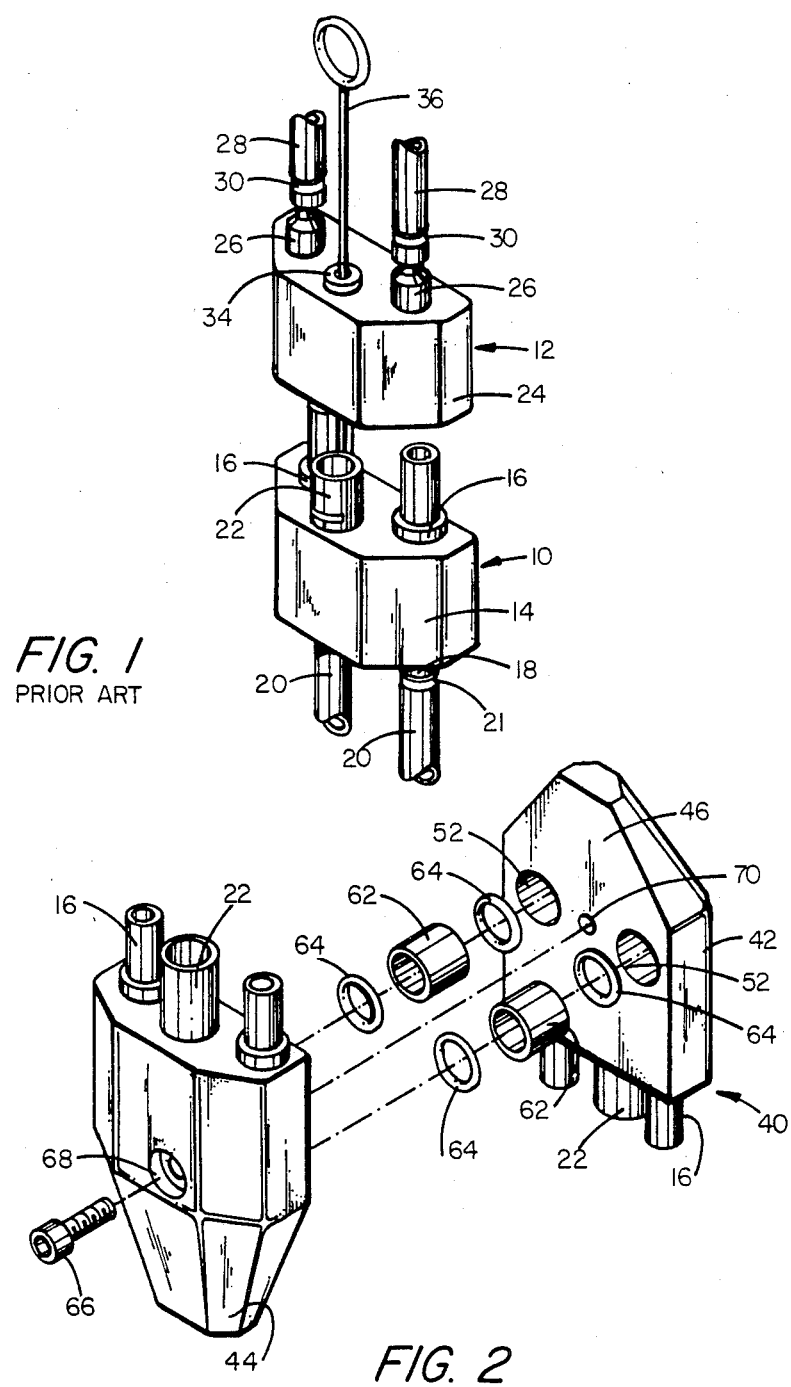
FIG. 1 is a perspective view showing a prior art coupling mechanism.
FIG. 2 is a perspective view of a connector according to the present invention.

Referring to the drawings, FIG. 1 illustrates a prior art connector such as that marketed by Life Support Systems, Inc. The connector includes mating male and female elements 10 and 12 respectively. The male element 10 includes a connector block 14 with two through passages each communicating at one end with a respective one of two valved male fittings 16 and at the other with a respective one of two hose fittings 18. As illustrated in FIG. 1, the hose fittings 18 connect directly to coolant lines 20 which are held in place by band clamps 21. The male connector element also includes a male lock component 22 that projects from the same end of the block 14 as the valved male fittings 16.

The female element 12 includes a block 24 with sockets in one end adapted to receive the male fittings 16 and a locking recess adapted to receive the lock component 22. The sockets communicate through fluid passages in the block 24 with hose fittings 26, in turn connected to respective hoses 28. The hoses 28 are held in place by band clamps 30. The female element 12 is equipped with a female lock component 34 which receives the male component 22 and locks it in place when the valved male fittings 16 are fully seated in the valved female sockets of the element 12. The lock is released by pulling on a lanyard 36 that extends from the female lock component. Subsequent tension on the lanyard provides a quick separation of the elements 10 and 12.

The valved male fittings 16 and the mating valved female sockets in the component 12 are closed to prevent liquid leakage when the elements 10 and 12 are separated. The valves are automatically opened when the elements 19 and 12 are seated on one another. The mechanism for this is known and will not be described in further detail.

Figure 3:
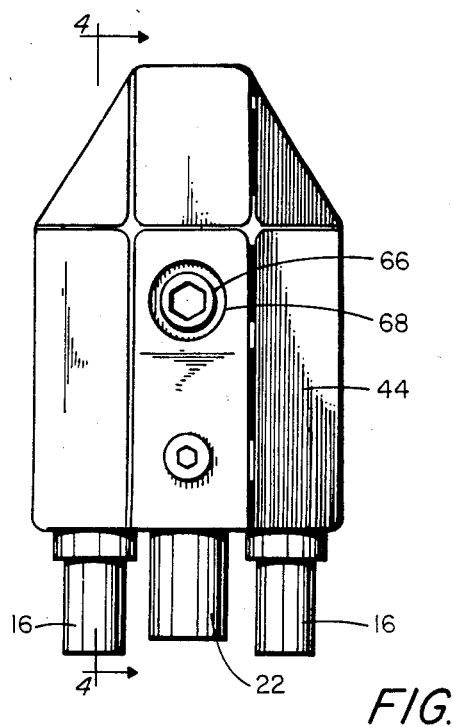
FIG. 3 is an elevation of the connector of FIG. 2 assembled to a garment.
Figure 4:
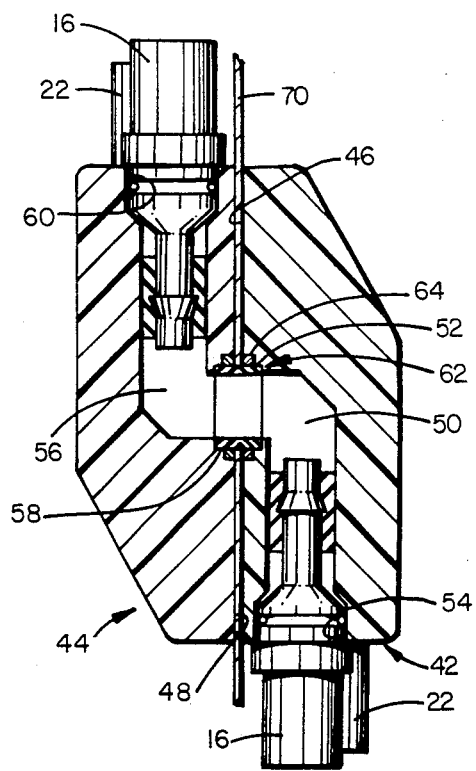
FIG. 4 is a section along line 4—4 of FIG. 3.

Referring now to FIGS. 2, 3 and 4, there is illustrated a connector 40 in accordance with the present invention. The connector includes an inner connector block 42 and an outer connector block 44. The blocks 42 and 44 have matching faces 46 and 48 respectively. The inner block 42 has two fluid passages 50 that extend through the block from respective ports 52 in the matching face 46 to ports 54 in an end of the block normal to the matching face. Similarly, the outer block 44 has a pair of through passages 56 that extend through the block from ports 58 in the matching face 48 to ports 60 in face of the block 44 normal to the matching face 48. The ports 52 and 58 align with one another when the two blocks are assembled.

Each of the ports 52 and 58 has a double counter bore. The inner counter bores accommodate coupling sleeves 62 that join aligned ports in the two blocks. The other counter bores accommodate O-ring seals 64.

The ports 54 and 60 are fitted with valved male fittings 16 that are the same as the fittings used in the male connector element 10 of FIG. 1. Blocks 42 and 44 also carry male lock components 22. The lock components and the fittings are positioned relative to one another such that a female element 12 of the FIG. 1 connector may be coupled directly to the end of each of the inner and outer blocks 42 and 44.

The two blocks 42 and 44 are fastened together with a socket head cap screw 66 extending through a bore 68 in the outer block 44 and into a threaded bore 70 in the inner block 42. The head of the cap screw is exposed on the outside for ready access to the event that it is desired to separate the two blocks, as during certain decontamination procedures.

The installed connector is illustrated in cross section in FIG. 4. As shown in that Figure, the sheet material 70 is equipped with holes to receive the coupling sleeves 62. The blocks are assembled with the sleeves extending through the holes and the O-rings 64 compressed between the blocks and the sheet material, around the ports. This arrangement has proven to provide the necessary sealing characteristics.

Figure 5:
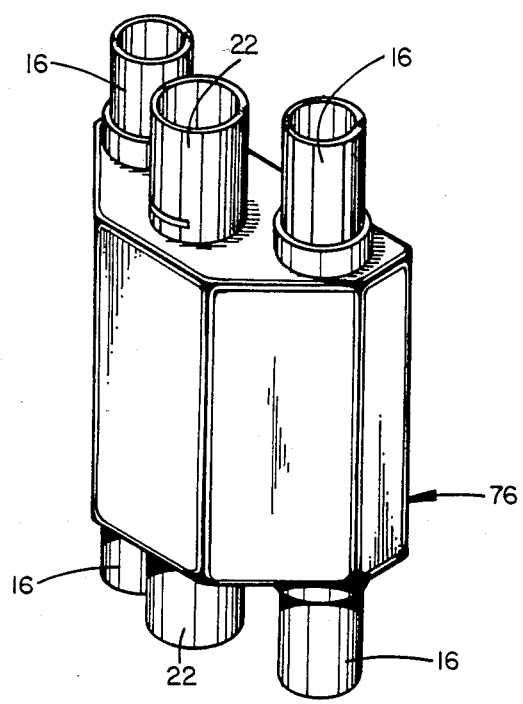
FIG. 5 is a perspective view of an auxiliary connector.

In some cases, it may be desired to connect the personal cooling garment to the coolant return and supply lines without passing through an immersion suit or chemical impervious outer garment. This may be accomplished with an auxiliary connector element such as illustrated in FIG. 5. The element 76 illustrated in that drawing is a double ended version of the male element 10 of FIG. 1, connectible to two female elements 12 in place of the through-garment connector of FIGS. 2, 3 and 4.

Figure 6:
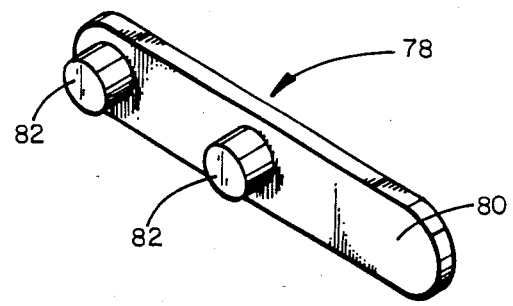
FIG. 6 is a perspective view of an auxiliary stopper and retainer element.

FIG. 6 illustrates a retaining and sealing element 78 with an elongate base 80 and two projecting plugs 82. The plugs are dimensioned and spaced to fit directly into the ports 52 or 58 in the inner or outer block 42 or 44 to seal the ports and to retain the sealed block on the sheet 70 when the other block is removed.

We claim:

1. A connector for connecting a fluid passage through a flexible sheet material, comprising:
    (a) inside and outside connector blocks with matching faces adapted to engage opposite faces of the sheet material;
    (b) two fluid passages through the inside and outside connector blocks meeting at respective ports in the matching faces, wherein said fluid passages terminate at external ports perpendicular to the ports in the matching faces;
    (c) coupling sleeves which extend through holes in the sheet material for joining the opposed ports in a fluid tight manner;
    (d) fastener means for securing the two blocks to one another;
    (e) O-rings on either side of the sheet material around the opening, said O-rings being compressed between the connector blocks and the sheet material around the ports to provide a fluid-tight seal, wherein said O-rings seal the matching faces of the blocks to respective faces of the sheet material, around the ports; and
    (f) a valved male fitting in each external port, wherein said valved male fittings are adapted to engage valved female elements of a quick disconnect connector communicating with coolant lines.

* * * * *